United States Patent [19]

Urbschat

[11] Patent Number: 4,710,855

[45] Date of Patent: Dec. 1, 1987

[54] HEADLIGHT FOR MOTOR VEHICLES

[75] Inventor: Ulrich Urbschat, Hamm, Fed. Rep. of Germany

[73] Assignee: Hella KG Hueck & Co., Lippstadt, Fed. Rep. of Germany

[21] Appl. No.: 927,238

[22] Filed: Nov. 4, 1986

[30] Foreign Application Priority Data

Dec. 4, 1985 [DE] Fed. Rep. of Germany ....... 3542784

[51] Int. Cl.$^4$ .............................................. B60Q 1/06
[52] U.S. Cl. ..................................... 362/66; 362/287; 362/289
[58] Field of Search ..................... 362/66, 61, 80, 267, 362/269, 282, 284, 287, 289, 322

[56] References Cited

U.S. PATENT DOCUMENTS 3,244,869  4/1966  Buck .................................... 362/267
4,569,007  2/1986  Dick .................................... 362/287
4,642,739  2/1987  Daumuller et al. ................. 362/267

FOREIGN PATENT DOCUMENTS 683865  6/1930  France ................................. 362/287

Primary Examiner—Samuel Scott
Assistant Examiner—Noah Kamen
Attorney, Agent, or Firm—Max Fogiel

[57] ABSTRACT

The invention concerns a headlight for motor vehicles with an annular mount that accommodates a cover plate and is connected to a reflector by an adjustment device and two bearings. The reflector can be pivoted around the axis of the bearings, which is horizontal when the headlight has been mounted. The reflector and the annular mount each have a cylindrical wall that face each other and overlap but do not come into contact with each other, and clamp between them a sealing ring that has a circular cross-section. The pivoting axis of the reflector is in the same plane as the sealing ring. The facing ends of the cylindrical wall of the reflector and of the mount face have no elevations or depressions. The two pivot bearings each consist of a tab shaped onto either the mount or the reflector and rotating on either the reflector or the mount.

12 Claims, 4 Drawing Figures

HEADLIGHT FOR MOTOR VEHICLES

BACKGROUND OF THE INVENTION

A headlight of this type is known from European Patent Application No. 0 129 922. The reflector has a cylindrical edge that parallels the direction the light emerges in, and the outside of the edge has a continuous groove around it that extends in a plane perpendicular to the optical axis. A sealing ring is snapped into the groove. The mount for the reflector also has a cylindrical edge that faces the reflector, and the cylindrical edge of the reflector is inserted into the cylindrical edge of the mount, with the sealing ring forced against the inner surface of the cylindrical edge of the mount, sealing the inside of the headlight off from the atmosphere. Two tabs are shaped onto the cylindrical edge of the reflector and extend parallel to the direction the light emerges in, with their free ends constituting two bearings in conjunction with the mount, which is annular. An adjustment device inserted between the mount and the reflector is activated to pivot the reflector around the axis of the bearings, which is horizontal when the headlight is installed. When the reflector is pivoted around its horizontal axis, either the upper or lower section of the sealing ring is either compressed or released very powerfully throughout its range of reslience because the axis is at a distance from a plane that is perpendicular to the optical axis and that the sealing ring lies in. This limits the range of adjustment of the reflector to a considerable extent and, as the rubber that the ring is made out of ages, the seal between the reflector and the mount loses its effectiveness. Furthermore, the sealing ring in the groove around the edge of the reflector rubs against the inside of the mount when the reflector pivots. To ensure that the reflector will pivot freely and smoothly, the sealing ring must be made out of soft rubber. Frequent pivoting of the sealing ring impairs the seal between the reflector and the mount because a sealing ring of soft rubber is very sensitive to wear. Although a hard-rubber ring is a lot less sensitive to wear, it must rest against the mount with a lot more force to maintain a satisfactory seal between the reflector and mount, and the reflector requires a lot more effort to adjust.

The axis that the reflector pivots on in another headlight, illustrated schematically in the drawing in European Patent Application No. 0 129 922, extends in the same plane that the sealing ring extends in when it is snapped over the reflector.

SUMMARY OF THE INVENTION

The object of the inventkon is to improve a vehicle headlight of the type generically described in the foregoing to the extent that the sealing ring will be compressed as little as possible beyond the extent that it is subjected to when mounted, even when the reflector is pivoted to the maximum. Furthermore, the reflector is to pivot freely and smoothly with little effort, the sealing ring is to be subject to no wear, and a satisfactory seal between the reflector and mount is to be ensured. This object is attained in accordance with the invention by the following characteristics:

(a) the pivoting axis of the reflector is in the same plane as the sealing ring,
(b) the facing ends of the cylindrical edge of the reflector and the cylindrical edge of the mount face have no elevations or depressions on either side of the plane that the sealing ring and the pivoting axis of the reflector extend in,
(c) the sealing ring has a circular cross-section when untensioned,
(d) the two pivot bearings each consist of a tab shaped onto either the mount or the reflector and rotating on either the reflector or the mount.

In an object of this type the sealing ring clamped between the cylindrical edge of the reflector and the cylindrical edge of the mount will roll when the pivoting motion is carried out, so that it will neither be compressed nor subjected to wear. It will simultaneously be practical for the plane that sealing ring lies in to extend perpendicular to the optical axis. The edges of the reflector and of the mount that clamp the sealing ring between them can also be cylindrical. The position of the sealing ring will accordingly remain constant and adjustable tool components will not be needed to manufacture the edges.

It will also be practical for the sealing ring to be capable of being slid, before the reflector and mount are assembled together, over a terminal section of the inner cylindrical edge that is constricted by a shoulder in the outer surface and for the shoulder in the outer surface to be small enough for the sealing ring to extend radially beyond the shoulder by more than half its diameter. In this embodiment it will be practical for the terminal section of the outer cylindrical edge to have a slip-on bevel facing the inner cylindrical edge that allows the sealing ring to roll in and be compressed between the separated edge when the outer edge is slid over the inner edge. This makes it possible to mount the sealing ring easily and rapidly either manually or automatically.

It will also be of advantage for the shoulder on the inner cylindrical edge and the slip-on bevel on the outer cylindrical edge to be equidistant from the plane that the sealing ring and the pivoting axis extend in. The sealing ring will accordingly roll into the desired position when the outer edge is slid over the inner edge.

It will also be of advantage for each tab to have an opening that is engaged by a pin on the reflector or mount, whereby the tabs are radially resilient and tensioned against the cylindrical edge of the reflector or mount. In this embodiment it will be practical for the free end of each tab to have a slip-on bevel on the side that rests against the reflector or mount. Each pin will accordingly snap automatically into a hole when the outer edge is slid over the inner edge.

The cylindrical edge of the reflector in the embodiment of the headlight in accordance with the invention can overlap the cylindrical edge of the mount either inside or outside.

The invention is illustrated in the drawings.

DESCRIPTION OF THE PREFERRED EMBODIMENTS

Figure 1:
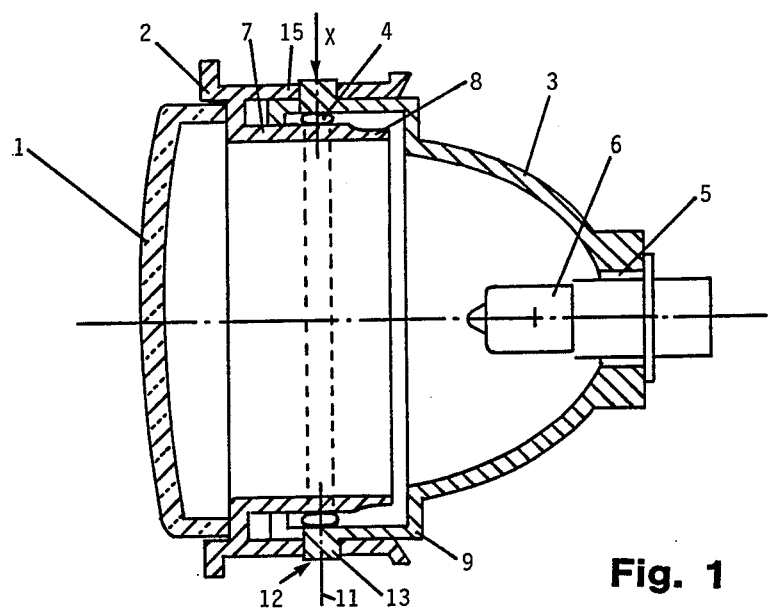
FIG. 1 is a vertical longitudinal section through the middle of a headlight.
Figure 2:
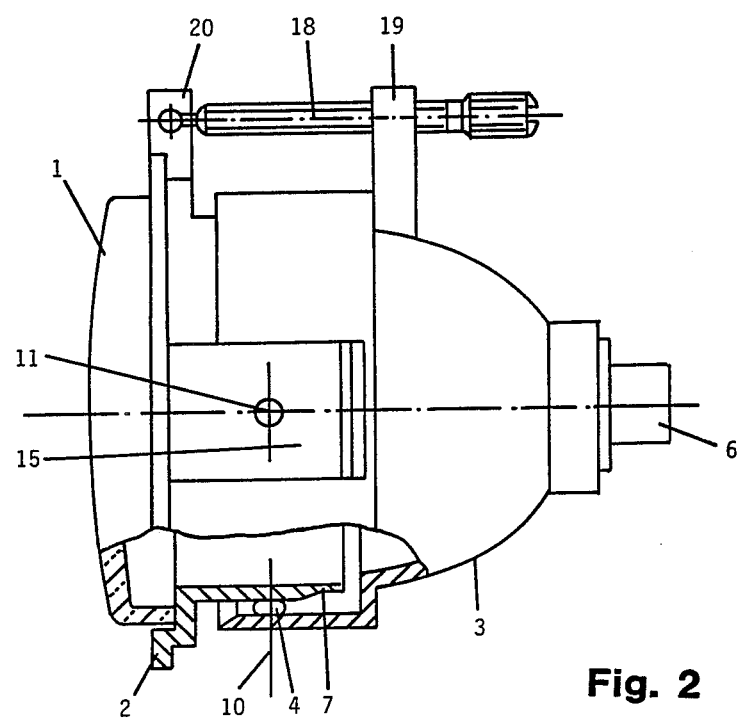
FIG. 2 is a view of the headlight along the direction indicated by the X.

The headlight illustrated in the drawings consists essentially of an annular amount 2 that accommodates a cover plate 1, of a reflector 3 that is articulated to the mount 2 at two bearing points, and of a sealing ring 4 clamped between the mount and the reflector.

An incandescent lamp 6 is secured in an opening 5 at the vertex of reflector 3. Annular mount 2 has a cylindrical wall 7 defining an edge facing the reflector. Cylindrical wall 7 has a terminal section 8 constricted by a shoulder in its outer surface. Reflector 3 has a cylindrical wall 9 defining an edge that parallels the direction the light emerges in and slides over the cylindrical wall 7 of the annular mount. The cylindrical wall 7 and 9 of annular mount 2 and of reflector 3 are equidistant from each other. A sealing ring 4 is clamped between both cylindrical wall 7 and 9. Sealing ring 4 extends in a plane 10 that is perpendicular to the optical axis. The axis 11 that reflector 3 pivots on and that is horizontal once the headlight has been installed lies in plane 10. Each of the bearings 12 for the pivoting axis consists of a pin 13 shaped onto the outer surface of the cylindrical wall 9 of reflector 3 and engaging an opening 14 in a tab 15 on annular mount 2 that is tensioned against the outer surface of the cylindrical wall 9 of reflector 3. The free end of each tab 15 has a slip-on bevel 16 and the cylindical wall 9 of reflector 3 has a slip-on bevel 17.

Figure 3:
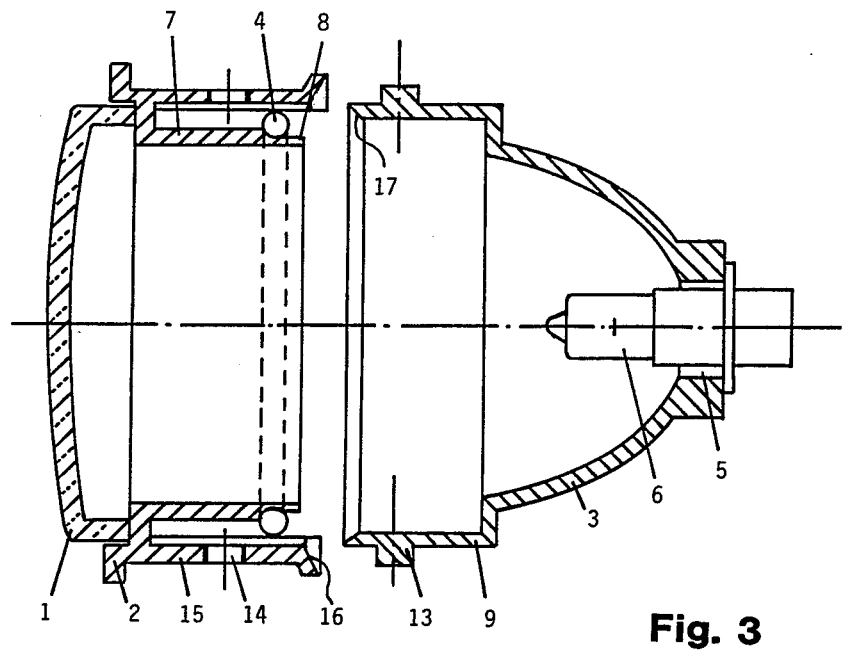
FIG. 3 illustrates the headlight before assembly, with tab shaped on the mount.

FIG. 3 illustrates the annular mount 2 that accommodates cover plate 1 and the reflector 3 before assembly. The sealing ring has been inserted under tension up to the shoulder in the outer surface of the cylindrical wall 7 of mount 2. When the cylindrical wall 9 of reflector 3 is slid over the cylindrical wall 7 of annular mount 7, sealing ring 4 will be compressed by the slip-on bevel 17 on the edge of reflector 3 and rolled in between cylindrical wall 7 and 9. Since the shoulder on cylindrical wall 7 and the slip-on bevel on cylindrical wall 9 are equidistant from plane 10, sealing ring 4 will lie within plane 10 once reflector 3 has been slid on. When the reflector is slid on, tabs 15 will spring out radially as their slip-on bevels 16 come into contact with pins 13. In the assembled state pins 13 will automatically snap into the openings 14 in the tabs. The reflector can then be adjusted around its pivoting axis 11 by activating a set screw 18 that is screwed into a projection 19 on the reflector and is articulated to a projection 20 on the annular mount.

Figure 4:
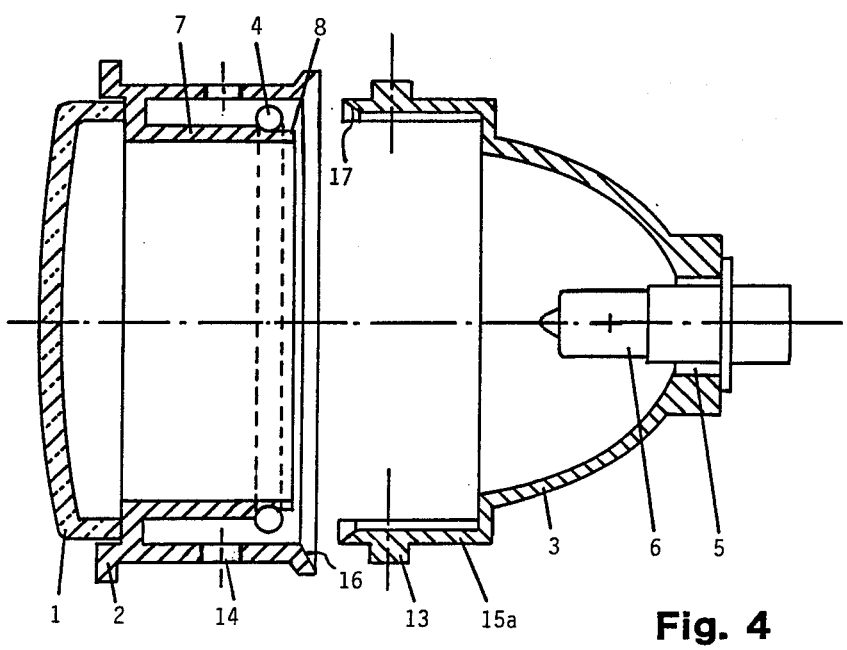
FIG. 4 is a sectional view of an alternate embodiment from FIG. 3, with the tab shaped on the reflector.

Each of the two pivot bearings 12 consist of a tab 15, or 15a (FIG. 4) shaped onto either the mount 2 or reflector 3, respectively, and rotating on either the reflector 3 or the mount 2.

I claim:

1. A headlight for motor vehicles comprising: a reflector, an annular mount, and adjustment means as well as two bearings connecting said reflector to said annular mount; said bearings having an axis, said reflector being pivotable about said axis by said adjustment means, said axis being horizontal when the headlight is mounted in place; a light lens held at a continuous edge of said mount facing in direction of emerging light; said mount having a cylindrical wall defining a cylindrical edge facing said reflector, said reflector having a cylindrical wall defining a cylindrical edge facing the cylindrical edge of said mount, one of said walls sized and partially disposed within the other of said wall in contactless overlap; a sealing ring clamped between surfaces of said cylindrical overlapping walls; said sealing ring defining a plane, said pivoting axis of said reflector being in said plane; said clamping surfaces being free of projections and depressions; said sealing ring having a circular cross-section when untensioned; each of said bearings comprising a tab formed onto said mount and rotatable on said reflector.

2. A headlight as defined in claim 1, wherein said cylindrical edge of said mount has a terminal section constricted by a shoulder in outer surface, said sealing ring being slidable over said terminal section before said reflector and said mount are assembled together, said sealing ring having a diameter, said shoulder being sufficiently small for the sealing ring to extend radially beyond said shoulder by more than half said diameter.

3. A headlight as defined in claim 2, wherein said cylindrical edge of said reflector has a terminal section with a slip-on bevel facing said cylindrical edge of said mount, said sealing ring being rollable in said bevel and being compressed between said cylindrical edges when said cylindrical edge of said reflector is slid over the cylindrical edge of said mount.

4. A headlight as defined in claim 3, wherein said shoulder and said slip-on level are equidistant from said plane.

5. A headlight as defined in claim 1, including a pin on said reflector, said tab having an opening engaged by said pin.

6. A headlight as defined in claim 1, wherein said tabs are radially resilient and tensioned against the cylindrical edge of said reflector.

7. A headlight as defined in claim 1, wherein each tab has a free end with a slip-on bevel on a side resting against said reflector.

8. A headlight as defined in claim 1, wherein the cylindrical wall of said reflector overlaps the cylindrical wall of said mount on the outside.

9. A headlight for motor vehicles comprising: a reflector, an annular mount, and adjustment means as well as two bearings connecting said reflector to said annular mount; said bearings having an axis, said reflector being pivotable about said axis by said adjustment means, said axis being horizontal when the headlight is mounted in place; a light lens held at a continuous edge of said mount facing in direction of emerging light; said mount having a cylindrical wall defining a cylindrical edge facing said reflector, said reflector having a cylindrical wall defining a cylindrical edge facing the cylindrical edge of said mount, one of said walls sized and partially disposed within the other of said wall in contactless overlap; a sealing ring clamped between surfaces of said cylindrical overlapping walls; said sealing ring defining a plane, said pivoting axis of said reflector being in said plane; said clamping surfaces being free of projections and depressions on both sides of said plane; said sealing ring having a circular cross-section when untensioned; each of said bearings comprising a tab formed onto said reflector and rotatable on said mount.

10. A headlight as defined in claim 9, including a pin on mount, said tab having an opening engaged by said pin.

11. A headlight as defined in claim 9, wherein said tabs are radially resilient and tensioned against the cylindrical edge of said mount.

12. A headlight as defined in claim 9, wherein each tab has a free end with a slip-on bevel on a side resting against said mount.

* * * * *